United States Patent [19]
Fritz et al.

[11] Patent Number: 5,837,894
[45] Date of Patent: Nov. 17, 1998

[54] WIDE FIELD OF VIEW SENSOR WITH DIFFRACTIVE OPTIC CORRECTOR

[75] Inventors: Teresa A. Fritz, Eagan; James C. Lee, Minneapolis, both of Minn.; Douglas B. Pledger, Medford, Wis.

[73] Assignee: Honeywell Inc., Minneapolis, Minn.

[21] Appl. No.: 385,621

[22] Filed: Feb. 9, 1995

[51] Int. Cl.⁶ .................................................. G01C 21/02
[52] U.S. Cl. ........................... 73/178 R; 250/206.2; 244/171
[58] Field of Search ................. 250/206.2; 244/171; 73/178 R

[56] References Cited

U.S. PATENT DOCUMENTS 3,162,764  12/1964  Haviland ............................ 250/342 X
4,792,685  12/1988  Yamakawa ............................ 250/353

Primary Examiner—Joseph L. Felber
Attorney, Agent, or Firm—Thomas A. Rendos

[57] ABSTRACT

A three-axis attitude orientation system for a spacecraft is described. The single sensor provides roll and pitch information by locating the centroid of the earth and using this as a reference point. The system determines yaw by tracking the position of stars which appear in the field of view around the earth. Three-axis attitude is determined through ultraviolet imaging of the earth's limb and adjacent stars. A diffractive optics sensor and intensified CCD array are utilized for this purpose.

19 Claims, 4 Drawing Sheets

WIDE FIELD OF VIEW SENSOR WITH DIFFRACTIVE OPTIC CORRECTOR

BACKGROUND OF THE INVENTION

1. Field of the Invention

This invention relates to spacecraft attitude control using a single sensor and, more specifically, to a sensor utilizing diffractive optics.

2. Description of the Related Art

Satellites and spacecraft are used widely and can serve a variety of purposes. A satellite may be used for communication purposes between multiple positions on the earth which would not otherwise have a direct means of communication. A satellite or spacecraft may also be used for scientific purposes. For example, the spacecraft may act as a platform for sensors which are either pointed at the earth or out into space.

A spacecraft requires an orientation system in order to keep the sensors pointed in the proper direction, or antennas pointed to the proper place on the earth. In most cases, a three-axis reference system must be used in order to provide the proper orientation. The spacecraft may then be stabilized through a variety of methods, such as magnetic torquers, chemical thrusters, moment or reaction wheels, or any combination of three.

The orientation of the spacecraft may be determined by a variety of systems. One system provides an earth horizon sensor which scans the edges of the earth in the visible light range to provide pitch and roll orientation, while a separate sensor, which locates the sun at particular times of the day, provides yaw information. During the periods when the sun measurement is not available, the yaw is estimated. Unfortunately, the horizon sensors may not provide accurate information of the pitch and roll because of atmospheric conditions on the earth.

Gyroscopes may be used in conjunction with the horizon sensors to provide yaw information. However, due to mechanical friction and other inefficiencies, the gyroscopes must be periodically updated in order to provide accurate information. This is typically accomplished by utilizing a variety of star sensors and ephemeris information.

Another type of system uses an infrared sensor to scan the earth and locate the centroid from which the spacecraft's pitch and roll can be determined. The limb of the earth can be scanned in the infrared range, as it provides a stable reference point for finding the centroid. The drawbacks of the infrared sensor are that its weight limits its applicability in many scenarios, it needs a cooling system, and it is unable to provide three-axis information. In most cases a gyroscope or an additional star must be used to provide yaw information.

U.S. Pat. No. 5,319,968 issued Jun. 14, 1994, to James A. Billing-Ross, Douglas B. Pledger and Teresa A. Fritz, herein incorporated by reference, and U.S. Pat. No. 5,319,969 issued Jun. 14, 1994, to James A. Billing-Ross and Douglas B. Pledger, also herein incorporated by reference, describes a three-axis attitude detection system for a spacecraft in earth's orbit utilizing a wide field of view ultraviolet imaging sensor, often called an Earth Reference Attitude Determination Sensor (ERADS). The wide field of view permits imaging of the entirety of the earth's ultraviolet limb and at least one background star which appears around the edge of the earth's horizon. This sensor utilizes a spherical lens to focus light from a wide field of view onto a detector, such as a CCD array.

It is well known that every optical material has an index of refraction that varies with the wavelength of light passing through the material. This property is referred to as the "dispersion" of the material. Thus, when light, having more than one wavelength, passes through the lens, each wavelength will have a different focal point. This effect is often referred to as chromatic aberration, which hinders most optical systems used for wide wavebands.

Accuracy, in any device utilizing a CCD, is limited by the number of pixels on the focal plane, the blur spot dimensions, and the photon count rates. Currently, the optimal blur diameter for centroiding algorithms utilizing a CCD array is about three pixels. Typically, a photon rate of 50/sample is needed to recognize a star. Ultimately, the photon rate is limited by aberration, construction materials, the diameter of the aperture and the spectral bandwidth. Unfortunately, such limitations preclude the recognition of dim stars.

One method of overcoming these problems, and thus increasing the photon rate, requires adding concentric spherical elements around the lens core. Such elements must be constructed of a different glass than the core. This reduces aberration and allows for a larger aperture. Unfortunately, adding the required elements would not only increase the cost and complexity of the system, but also the weight, a critical parameter for any space-based application. Furthermore, many times an optical material having the required index of refraction to fix the problems does not exist.

SUMMARY OF THE INVENTION

A three-axis attitude orientation system for a spacecraft is described. The single sensor provides roll and pitch information by locating the centroid of the earth and using this as a reference point. The system determines yaw by tracking the position of stars which appear in the field of view around the earth. Three-axis attitude is determined through ultraviolet imaging of the earth's limb and adjacent stars. A diffractive optics sensor and intensified CCD array are utilized for this purpose.

DESCRIPTION OF THE PREFERRED EMBODIMENTS

Figure 1:
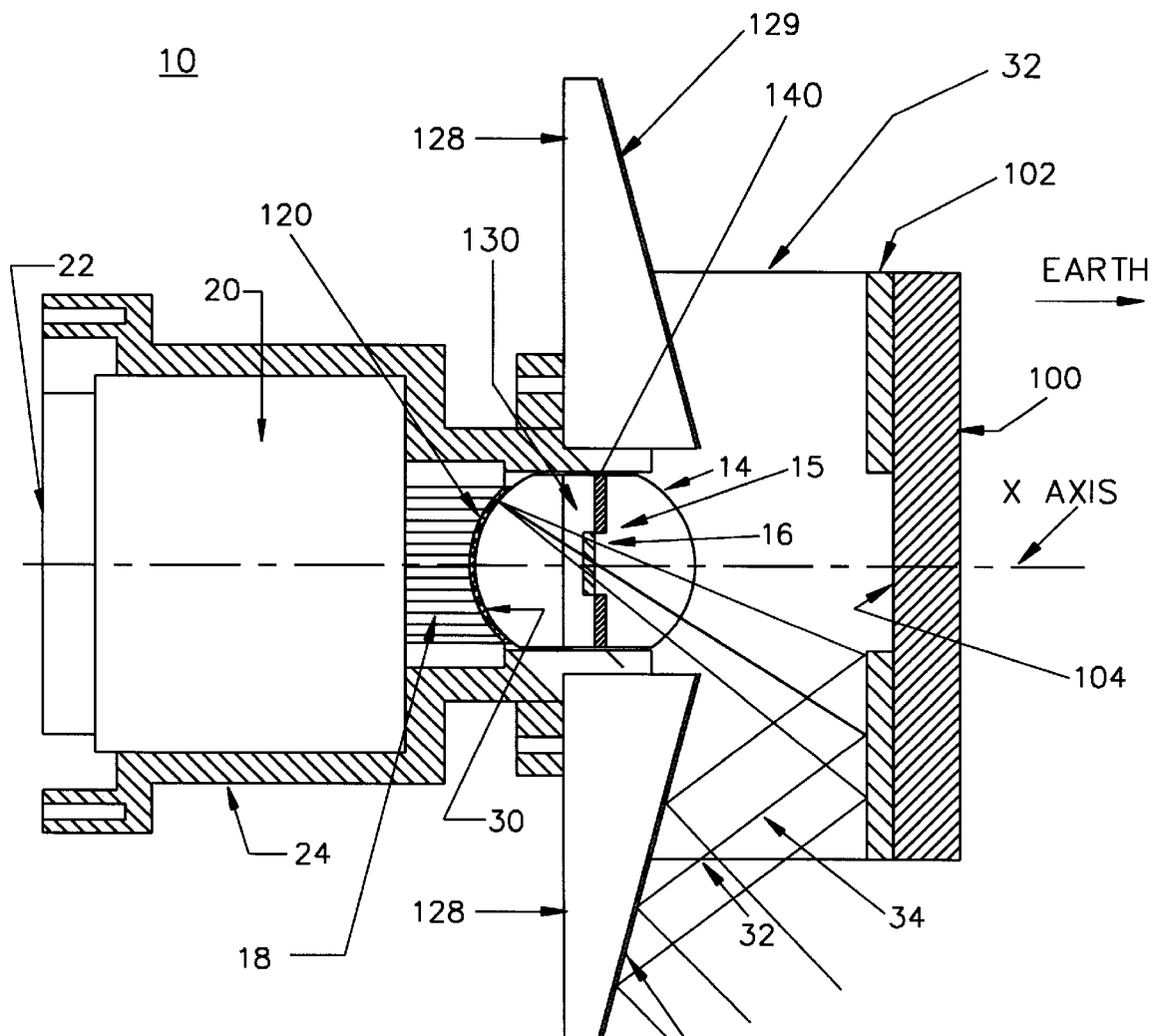
FIG. 1 is a cross-sectional view of the sensor assembly.

FIG. 1 is a cutaway view of a sensor assembly 10. Included in assembly 10 is a transmissive substrate 100, having an ultraviolet reflective coating 102 with an aperture 104. Prisms 128, having an ultraviolet reflective coating 129, surround sensor housing 24 and direct light onto ultraviolet reflective coating 102 and into a spherical lens 14. Spherical lens 14 is further comprised of a substrate 130 having an optical barrier 140 deposited thereon which defines an aperture stop 15. A diffractive aperture 16 is etched within the aperture stop 15 and corrects the aberrated wave front passing through lens image surface 30 and impinging on a fiber optic field flattener 18. A visible light-reflective coating 120 is deposited on image surface 30. The fiber optic field flattener 18 is shaped so as to match the curvature of spherical lens 14, and positioned adjacent to spherical lens 14 along its image surface 30. The fiber optic field flattener is connected to the image intensifier 20 which, in turn, is connected to a mega-pixel CCD array 22.

In order to determine the spacecraft attitude, a processor analyzes the information from the CCD. One such system is described in the aforementioned U.S. Pat. Nos. 5,319,968 and 5,319,969, herein incorporated by reference. In that system, a processor determines rotation around the pitch and roll axis of the spacecraft through imaging of the earth's ultraviolet limb. Rotation about the yaw axis of the spacecraft is determined either through comparison of the actual location of the background stars with the predicted locations from ephemeral data or by comparing the actual location of the terminator crossing on the earth's limb with the predicted location of the terminator from ephemeral data.

Fiber optic field flattener 18, image intensifier 20 and mega-pixel CCD array 22 cooperatively act as an ultraviolet detector. Those skilled in the art will recognize other detectors that can be utilized consistent with the teachings of this invention.

In the preferred embodiment, ultraviolet reflective coating 102 and ultraviolet reflective coating 129 are constructed so as to reflect light having wavelengths between 260 and 300 nanometers, often referred to as the UVB band in the ultraviolet spectrum. Several coatings, widely known to those skilled in the art, have these described properties. In the preferred embodiment, an ultraviolet coating can be constructed from multiple layers of low reflectivity and high reflectivity material. $MgF_2$ can be utilized as a low reflectivity material, while $ZrO_2$ can be utilized as a high reflectivity material. Typically) these layers are formed by vapor deposition.

To reflect light perpendicular to the surface, each layer typically has a thickness equal to ¼ the wavelength of the light to be reflected. When reflecting a band of light having multiple wavelengths, the reflective coating is typically designed to provide maximum reflection to the center wavelength. Those skilled in the art will understand, however, that the reflectivity is dependent not only upon the thickness of the layers, but also upon the angle of the light being reflected.

Visible light-reflective coating 120 is designed to reflect any light having a wavelength greater than 380 nm, while allowing ultraviolet light to pass. This type of coating is often referred to as an edge filter. In the preferred embodiment, reflective coating 120 is comprised of multiple layers described by the notation:

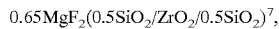

$$0.65MgF_2(0.5SiO_2/ZrO_2/0.5SiO_2)^7,$$

where a coefficient of 1.0 is a thickness equal to a quarter wavelength. Thus, 1.0 $SiO_2$ and 1.0 $ZrO_2$ means one-quarter wavelength optical thickness of quartz and zirconia, respectively, at a wavelength of 525 nm. This wavelength locates the band of high reflectance. The 0.5 $SiO_2$ stands for an eighth wavelength of quartz. The 0.65 magnesium fluoride layer is deposited on spherical lens 14. The 0.65 of a quarter wavelength thickness is the optimum thickness to best couple the reflective coating 120 to spherical lens 14. It should also be noted that the nomenclature $(0.5SiO_2/ZrO_2/0.5SiO_2)^7$ means the layers denoted within the parentheses are repeated on top of each other seven times. So $(0.5SiO_2/ZrO_2/0.5SiO_2)^7$ denotes an eighth wavelength layer of quartz followed by 13 quarter wavelength layers of alternating zirconia and quartz (i.e. seven zirconia and six quartz), finally with an eighth wavelength of quartz over the last zirconia layer.

One skilled in the art will recognize other compositions that can be utilized consistent with the teachings of this invention. One such composition is comprised of multiple layers wherein each of the layers has a thickness equal to ⅛ the wavelength of the light to be reflected. The bottom most layer (i.e. the layer closest to spherical lens 14) is comprised of a low reflectivity material, while the top most layer (i.e. the layer farthest from spherical lens 14) is comprised of a high reflectivity material. Each of the middle layers is comprised of a sublayer of low reflectivity material deposited on top of a sublayer of high reflectivity material, such that two sublayers of the same reflectivity are never juxtaposed with each other.

It should be noted that the structure described above can be inverted so that the bottom most layer is comprised of a high reflectivity material, while the top layer is comprised of a low reflectivity material and each of the middle layers is inverted as well. It should be noted that such a design might reduce the bandwidth of light reflected by visible light-reflecting layer 120.

Aperture 104 is designed to allow ultraviolet and visible light to pass through it to spherical lens 14. This design permits the detection of energy emanating not only from the wide field of view, but also any energy traveling close to the optical axis of the satellite.

It should be noted that ultraviolet reflective coating 102 can be applied to transmissive substrate 100 without forming an aperture 104. If a small aperture is formed in visible light-reflective coating 120, CCD 22 will be able to view a combination of ultraviolet light from the wide field of view and only visible light along the optical axis.

Some applications are designed only to sense energy from the wide field of view. For those applications, those skilled in the art will understand that transmissive substrate 100 can be replaced with a non-transmissive substance and/or covered entirely with ultraviolet reflective coating 102.

Figure 2:
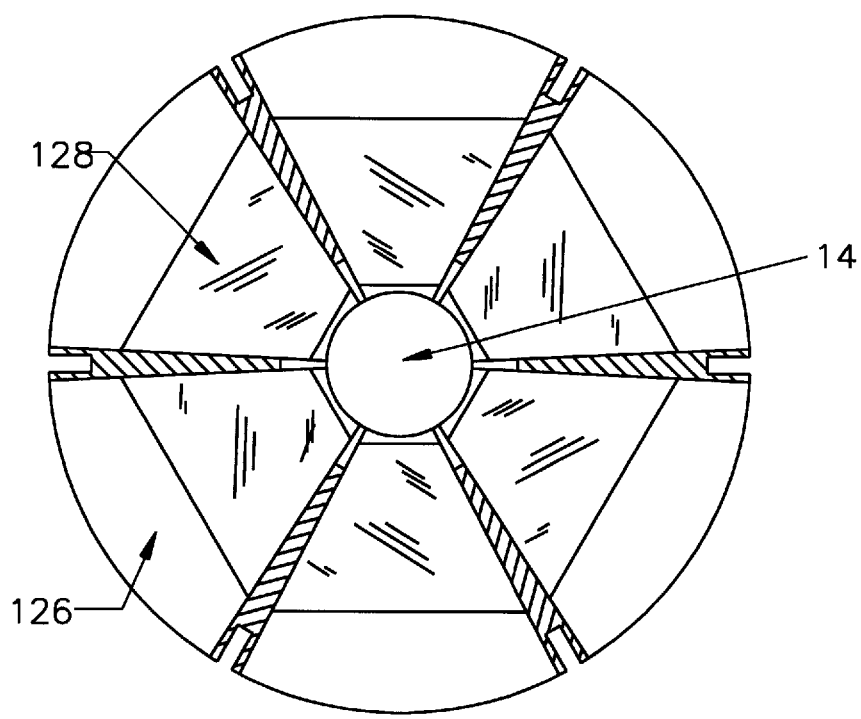
FIG. 2 is a plan view of the mirror assembly.

FIG. 2 is a plan view of a mirror assembly 112. The assembly includes six prisms 128 laid out in a hexagonal shape. Prisms 128 are attached to a support structure 126 which is mounted around the sensor housing 24. One skilled in the art will understand that the size of the prisms are determined by the field of view and the distance between spherical lens 14 and ultraviolet reflective coating 102.

As depicted in FIG. 1, when sensor assembly 10 is part of an orbiting satellite, the satellite is positioned so that the X-axis points towards the earth, with aperture 104 positioned between the spherical lens 14 and the earth. In operation, the sensor will view the region from the surface to 10 degrees above the earth, or any other portion of the celestial sphere. A combination of mirror assembly 112, which acts as a reflective field reducer, and spherical lens 14 is used to image these large angles.

The satellite is aligned so that light rays 34 are directed by ultraviolet reflective coating 129, onto ultraviolet reflective coating 102 and then into spherical lens 14. Light rays 34 are refracted towards the center of the lens. The diameter of the stop aperture 15 defined by optical barrier 140 limits the amount of light which passes through lens 14, while diffractive aperture 16 corrects the light for aberrational error. Because of the shape of the lens in relation to the aperture, the only third-order Seidel aberrations present are spherical aberration and Petzval curvature. Spherical aberration is minimized by using a sapphire lens which has a very high refractive index. The curvature of image surface 30 on the spherical lens 14 is matched to the Petzval curvature. This makes the lens more compact and useful over a wide field of view. By using the curved image surface, the beams which pass through the lens are at normal incidence to the image surface, which is favorable for illumination at the high field angles.

The curved surface of the fiber optic field flattener 18 is positioned adjacent to the curved image surface 30. The surface of the field flattener is coated with a medium 121 which converts ultraviolet light to visible light for transmission through the fiber bundle. Reflective coating 120 redirects any converted visible light emitted towards diffractive aperture 16 from the converting medium 121, thus maximizing energy directed into field flattener 18.

The image is then transmitted through the image intensifier tube 20 to the mega-pixel CCD array 22. CCD array 22 converts the visible light image into a digitized electrical signal.

Figure 3:
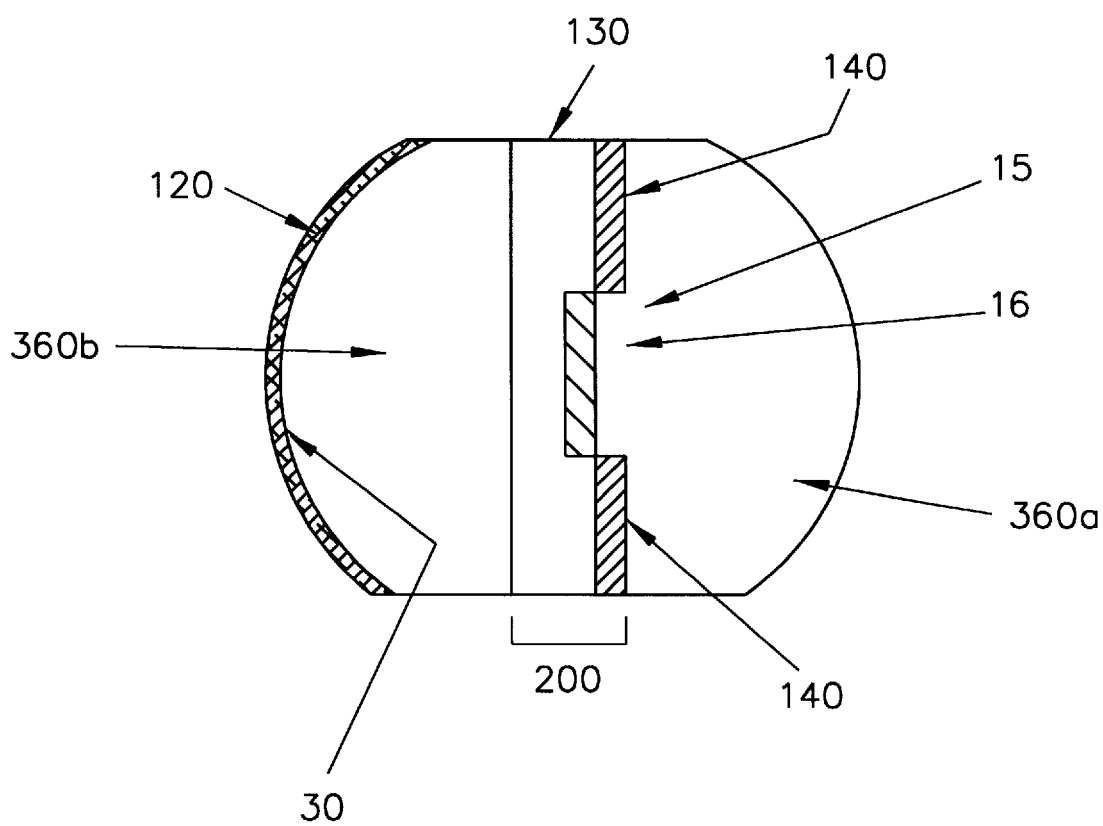
FIG. 3 further depicts a spherical lens having a diffractive element.

FIG. 3. further depicts spherical lens 14. It should be noted that components having the same function as in previous figures have retained the same numerical designation. Spherical lens 14 is comprised of a diffractive element 200 which separates the front hemisphere 360a from the rear hemisphere 360b of spherical lens 14. Diffractive element 200 is comprised of a substrate 130 having an optical barrier 140 deposited on its periphery, and a diffractive aperture 16 etched into the center of substrate 130. Optical barrier 140 prevents light on the periphery of aperture 16 from impinging on image surface 30.

In the preferred embodiment, sapphire substrate 130 has 1.161 in. diameter and is 0.138 in. thick. Optical barrier 140 is comprised of a half micron thick thin film of aluminum. Diffractive element 200 is cemented on both sides between hemispheres 360 with optical cement. Because of the large angle of incidence for large field angles, optical cement is required to prevent total internal reflection (TIR) at the sapphire-air interface. The optical cement, in the preferred embodiment, has an index of refraction of 1.46, while the index of refraction of all three sapphire elements is 1.82.

It should be noted that sapphire is a uniaxial crystal which exhibits birefringence, with a difference of approximately 0.008 between the ordinary and extraordinary index of refraction throughout the UV and visible region. Under certain conditions, birefringence can cause multiple images. In order to minimize the separation of these image spots, the crystal axes in the two hemispheres of the lens were made orthogonal. The C-axis hemisphere 360a is parallel to the optical axis, and the C-axis of hemisphere 360b is parallel to diffractive element 200.

Figure 4:
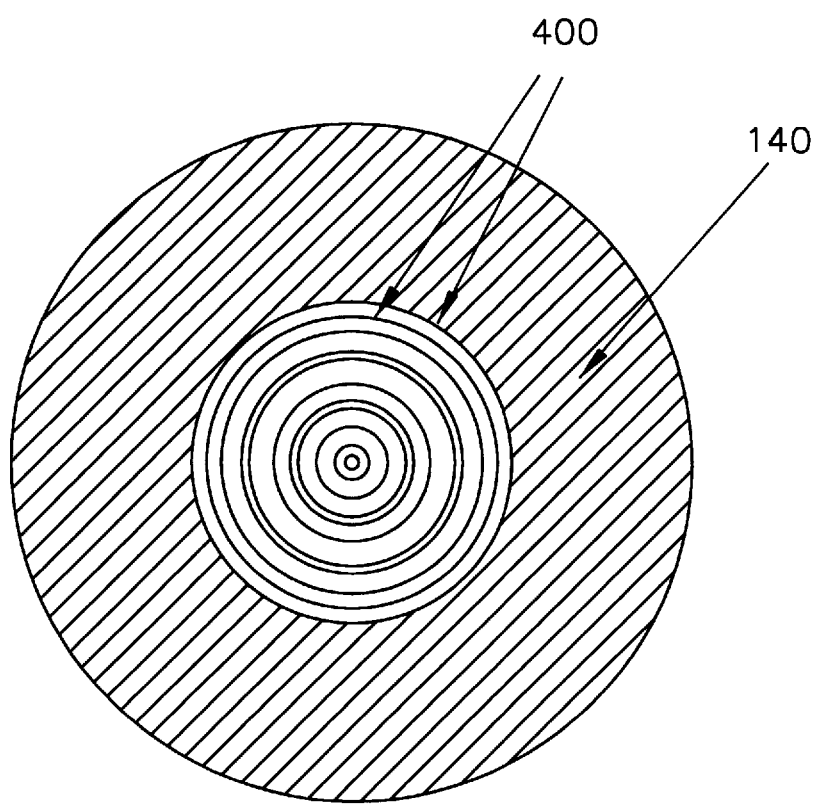
FIG. 4 is a plan view of a diffractive aperture.

FIG. 4. is a plan view of diffractive element 200. Components having the same function as in previous figures have retained the same numerical designation. Diffractive aperture 16 is comprised of a plurality of zones 400. Each zone 400 varies in width and has multiple depths. The position of each zone is determined by the type and magnitude of the aberrational errors present in spherical lens 14. This positions of the zones are derived from the following mathematical equation.

$$OPD(r) = C_0 + C_1 r + C_2 r^2 + \ldots + C_{n-1} r^{n-1} + C_n r^n; \text{ where}$$

$C_n$=a coefficient whose value is determined by several characteristics, including focal length, type of glass, radius of curvature, wavelength of light and thickness;

OPD(r)=multiples of the wavelength being optimized;
r=radius of the zone, from the center of the aperture.

In order to determine the location of a particular zone 400, the center wavelength multiplied by the zone number is substituted for OPD and the coefficients are calculated based on the characteristics of the optical assembly. Factor "r" is derived after substituting these values. The amount of aberration correction is dependent upon the number of terms used in the OPD equation. As more terms are included in the OPD equation, the correction will become more accurate.

In the preferred embodiment, zones 400 are intended to correct chromatic aberration, spherical aberration and spherochromatism, the difference in the amount of spherical aberration between wavelengths. Thus, only the second and fourth order polynomials are required. Based on the physical characteristics of spherical lens 14 previously described, the following equation is utilized to calculate the position of zones 400.

$$OPD(r) = -1.757 * 10^{-3} r^2 + 6.6202 * 10^{-5} r^4$$

Those skilled in the art will recognize that diffractive aperture 16 can be manufactured using a variety of techniques. Binary optics is one such technique. This technique utilizes three mask levels, two alignments, and three separate etches of depths 961 Å, 1921 Å, and 3842 Å, which reflect the index matching of the sapphire optical elements and the optical cement. This allows each zone 400 to have eight different depths. Adding a fourth mask allows each zone 400 to have sixteen different depths. It should also be noted that other methods, such as laser etching and stamp pressing, can be utilized instead of the binary optics technique described.

To calculate the radius of each zone in the preferred embodiment, the center wavelength is multiplied by a specific fraction of a wavelength. Because of the three masks, three different multipliers (½ wave, ¼ wave and ⅛ wave) are used.

$$\left( OPD(r) = \left( \lambda_c \left( \frac{2n-1}{mul} \right) \right) \right),$$

where n goes from 1 to max
Rad(n)=the radius of zone n;
$\lambda_c$=center wavelength;

$$max = mod\left( \frac{OPD(r_a)}{\lambda_c} \right),$$

the number of radii to be calculated;
$r_a$=radius of diffractive aperture 16;
mul=a constant (2, 4, or 8) depending on which mask is being calculated; and It should noted that the above equation illustrates one method of calculating the radii. Those skilled in the art will recognize that the radii can be calculated individually from the OPD equation for a given wavelength. In the preferred embodiment, diffractive aperture 16 is comprised of forty-one zones having the radii described in Table 1.

TABLE 1

| Radii of Zones (in μm) |
|---|
| 1) 400.4 |
| 2) 568.0 |
| 3) 697.9 |
| 4) 808.4 |
| 5) 906.8 |
| 6) 996.7 |
| 7) 1080.2 |
| 8) 1158.8 |
| 9) 1233.5 |

TABLE 1-continued

Radii of Zones (in μm)

| | |
|---|---|
| 10) | 1304.9 |
| 11) | 1373.7 |
| 12) | 1440.3 |
| 13) | 1505.0 |
| 14) | 1568.1 |
| 15) | 1629.8 |
| 16) | 1690.4 |
| 17) | 1750.0 |
| 18) | 1808.8 |
| 19) | 1867.0 |
| 20) | 1924.6 |
| 21) | 1981.9 |
| 22) | 2038.9 |
| 23) | 2095.8 |
| 24) | 2152.6 |
| 25) | 2209.5 |
| 26) | 2266.7 |
| 27) | 2324.3 |
| 28) | 2382.4 |
| 29) | 2441.3 |
| 30) | 2501.0 |
| 31) | 2561.9 |
| 32) | 2624.2 |
| 33) | 2688.3 |
| 34) | 2754.5 |
| 35) | 2823.6 |
| 36) | 2896.2 |
| 37) | 2973.6 |
| 38) | 3057.6 |
| 39) | 3151.4 |
| 40) | 3261.9 |
| 41) | 3410.4 |

As described, aperture 16 corrects the aberration contained in the wave front. By correcting spherical aberration and longitudinal color, the aperture stop 15 may be increased by a factor of 1.3 and the waveband doubled when compared to a non-diffractive aperture, yet still maintain the same spot size. This yields an increase of more than three times the energy for the same spherical lens 14, with only about 10–15% energy loss from using a diffractive aperture 16 over a wide field of view.

Another advantage of the diffractive aperture 16 is that energy from extra orders of the diffractive optic are undeviated. The spot size increases, but the extra orders are located right on top of the desired first order. This slight change in spot size has no effect on the centroiding algorithms of the sensor.

As seen in FIG. 2, six to eight prisms 128 are positioned in a hexagonal or octagonal pattern rather than a continuous mirror. A continuous mirror would preserve mapping, but would introduce a great amount of astigmatism, which reduces resolution. This allows prisms 128 to preserve wave front quality, but introduce mapping distortion tangential to the limb. There are regions of ambiguity and missing data in the image at each mirror seam due to this mapping distortion. Because of the centroiding nature of the attitude determination and the total number of stars visible, this distortion is not detrimental to overall sensor performance.

Although the present invention has been described with reference to preferred embodiments, those skilled in the art will recognize changes that may be made, in form or detail, without departing from the spirit and scope of this invention. The applicant does not intend to limit the invention through the foregoing description, but instead define the invention through the claims appended hereto.

We claim:

1. A three-axis attitude determination system for a spacecraft orbiting earth comprising:

a detector mounted on the spacecraft;

a diffractive optical sensor assembly coupled to said detector for focusing light from a wide field of view onto said detector, wherein the wide field of view includes the entirety of earth's ultraviolet limb and one of earth's terminator crossing and at least one background star, said attitude determination system determining rotation around pitch and roll axes of the spacecraft through imaging of the earth's ultraviolet limb, and rotation about a yaw axis of the spacecraft through comparison of the actual location and the predicted location from ephemeral data of one of the terminator crossing and the at least one background star, said diffractive optical sensor assembly, including:

a spherical lens having a diffractive element defined by a substrate having a diffractive pattern etched thereon.

2. The three-axis determination system of claim 1, wherein the diffractive optical assembly further includes:

a mirror assembly to reflect light from the field of view into said spherical lens.

3. The three-axis determination system of claim 2, wherein said mirror assembly further includes:

a first mirror to reflect light into said spherical lens; and a plurality of second mirrors to direct light from the field of view onto the first mirror in a manner which reduces the effective field of view.

4. The three-axis determination system of claim 2, wherein said mirror assembly further includes:

a substrate having a mirror coating to reflect light into said spherical lens; and a plurality of mirrors to reflect light from the field of view onto the mirror coating of the substrate.

5. The three-axis determination system of claim 4, wherein each of said plurality of mirrors is further comprised of:

a prism; and a light reflective coating deposited on said prism.

6. The three-axis determination system of claim 4 wherein said mirror coating has an aperture to allow non-reflected light to enter said spherical lens.

7. The three-axis determination system of claim 1, further comprising an ultraviolet transmitting and visible light-reflecting medium adjacent to the spherical lens.

8. The three-axis determination system of claim 7, wherein said ultraviolet transmitting and visible light-reflecting medium is comprised of:

a base coating having a first index of refraction;

a plurality of triple coatings deposited on said base coating, each of said triple coatings comprised of a top coating and a bottom coating having a second index of refraction and a middle coating having a third index of refraction.

9. The three-axis determination system of claim 1, wherein the detector further includes:

a fiber optic field flattener adjacent to the spherical lens;

a converting medium between the lens and the fiber optic field flattener to convert UV light to visible light;

an image intensifier connected to the fiber optic field flattener; and a CCD array connected to the image intensifier to convert the visible light into a digitized electric signal.

10. The three-axis determination system of claim 9, further comprising an ultraviolet transmitting and visible light-reflecting medium between the spherical lens and the converting medium.

11. A three-axis attitude determination system for a spacecraft orbiting earth comprising:
    a detector mounted on the spacecraft, said detector including:
        a converting medium for converting UV light to visible light:
    a diffractive optical sensor assembly coupled to said detector for focusing UV light from a wide field of view onto said converting medium of said detector, wherein the wide field of view includes the entirety of earth's ultraviolet limb and one of earth's terminator crossing and at least one background star,
    said attitude determination system determining rotation around pitch and roll axes of the spacecraft through ultraviolet imaging of the earth's limb, and rotation about a yaw axis of the spacecraft through a comparison of the actual location and the predicted location from ephemeral data of one of the terminator crossing and the at least one background star, said diffractive optical sensor assembly including:
        a spherical lens; and
    an ultraviolet transmitting and visible light-reflecting medium between the spherical lens and the converting medium.

12. The three-axis determination system of claim 11, wherein the diffractive optical assembly further includes:
    a mirror assembly to reflect light from the field of view into said spherical lens.

13. The three-axis determination system of claim 12, wherein said mirror assembly further includes:
    a first mirror to reflect light into said spherical lens; and
    a plurality of second mirrors to direct light from the field of view onto the first mirror in a manner which reduces the effective field of view.

14. The three-axis determination system of claim 12, wherein said mirror assembly further includes:
    a substrate having a mirror coating to reflect light into said spherical lens; and
    a plurality of mirrors to reflect light from the field of view onto the mirror coating of the substrate.

15. The three-axis determination system of claim 14, wherein each of said plurality of mirrors is further comprised of:
    a prism; and
    a light reflective coating deposited on said prism.

16. The three-axis determination system of claim 14, wherein said mirror coating has an aperture to allow non-reflected light to enter said spherical lens.

17. The three-axis determination system of claim 11, wherein said spherical lens includes a diffractive element defined by a substrate having a diffractive pattern etched thereon.

18. The three-axis determination system of claim 11, wherein said ultraviolet transmitting and visible light-reflecting medium between the spherical lens and the converting medium is comprised of:
    a base coating having a first index of refraction;
    a plurality of triple coatings deposited on said base coating, each of said triple coatings comprised of a top coating and a bottom coating having a second index of refraction and a middle coating having a third index of refraction.

19. The three-axis determination system of claim 11, wherein the detector further includes:
    a fiber optic field flattener, said
    converting medium being located between the spherical lens and said fiber optic field flattener;
    an image intensifier connected to the fiber optic field flattener; and
    a CCD array connected to the image intensifier to convert the visible light into a digitized electric signal.

\* \* \* \* \*